United States Patent
Schade et al.

(10) Patent No.: US 10,067,288 B2
(45) Date of Patent: Sep. 4, 2018

(54) METHOD AND DEVICE FOR PRODUCING AT LEAST ONE FIBER BRAGG GRATING

(71) Applicant: Fraunhofer Gesellschaft Zur Förderung Der Angew. Forschung E.V., München (DE)

(72) Inventors: Wolfgang Schade, Goslar (DE); Jörg Burgmeier, Osterode (DE)

(73) Assignee: Fraunhofer Gesellschaft Zur Forderung Der Angew. Forschung E.V., Munich (DE)

( * ) Notice: Subject to any disclaimer, the term of this patent is extended or adjusted under 35 U.S.C. 154(b) by 352 days.

(21) Appl. No.: 14/650,370

(22) PCT Filed: Dec. 2, 2013

(86) PCT No.: PCT/EP2013/075232
§ 371 (c)(1),
(2) Date: Jun. 8, 2015

(87) PCT Pub. No.: WO2014/086708
PCT Pub. Date: Jun. 12, 2014

(65) Prior Publication Data
US 2015/0309251 A1 Oct. 29, 2015

(30) Foreign Application Priority Data
Dec. 6, 2012 (DE) .................. 10 2012 222 460

(51) Int. Cl.
G02B 6/02 (2006.01)
B23K 26/00 (2014.01)
H01S 3/00 (2006.01)

(52) U.S. Cl.
CPC ........ *G02B 6/02128* (2013.01); *B23K 26/006* (2013.01); *G02B 6/02147* (2013.01); *G02B 6/02152* (2013.01); *H01S 3/0057* (2013.01)

(58) Field of Classification Search
CPC ............ G02B 6/02128; G02B 6/02147; G02B 6/02152; H01S 3/0057; B23K 26/006
See application file for complete search history.

(56) References Cited

U.S. PATENT DOCUMENTS

| 5,104,209 A | 4/1992 | Hill et al. |
| 2005/0271349 A1 | 12/2005 | Obara et al. |

(Continued)

FOREIGN PATENT DOCUMENTS

DE    102005029557 A1    1/2007

OTHER PUBLICATIONS

International Search Report dated Feb. 19, 2014 (PCT/EP2013/075232).

(Continued)

*Primary Examiner* — Mathieu Vargot
(74) *Attorney, Agent, or Firm* — Alix, Yale & Ristas, LLP

(57) ABSTRACT

The invention relates to a method and a device for producing at least one fiber Bragg grating in a waveguide, wherein the waveguide has at least one core having a first refractive index and the fiber Bragg grating contains a plurality of spatial regions which each occupy a partial volume of the core and have a second refractive index, wherein the spatial regions are each produced by the action of laser radiation on a partial volume of the core, wherein the laser radiation contains a plurality of pulse trains each containing a plurality of individual pulses, wherein the time interval between successive individual pulses is smaller than the time interval between successive pulse trains and the time interval between successive individual pulses is chosen between 10 ns and 100 ps or the pulse train has a duration of 50 fs to 50 ps.

16 Claims, 3 Drawing Sheets

(56) References Cited

U.S. PATENT DOCUMENTS

| | | | |
|---|---|---|---|
| 2010/0197116 A1* | 8/2010 | Shah | B23K 26/38 438/463 |
| 2010/0303105 A1* | 12/2010 | Zimer | H01S 3/117 372/13 |
| 2012/0039567 A1 | 2/2012 | Herman et al. | |

OTHER PUBLICATIONS

Wikszak, Elodie at al., "Recording of fiber Bragg gratings with femtosecond pulses using a "point by point" technique," Lasers and Electro-Optics, May 16, 2004.

Martinez, A. et al., "Direct writing of fibre Bragg gratings by femtosecond laser," Electronics Letters, vol. 40, No. 19, Sep. 16, 2004.

Herman, Peter R. et al., "Ultrashort-pulsed laser direct writing of strong Bragg grating waveguides in bulk glasses," Optical Fiber Communication/National Fiber Optic Engineers Conference, Feb. 24, 2008.

Geernaert, Thomas et al., "Point-by-point fiber Bragg grating inscription in free-standing step-index and photonic crystal fibers using near-IR femtosecond laser," Optics Letters, The Optical Society, vol. 35, No. 10, May 15, 2010.

Grenier, Jason R. et al., "Femtosecond laser fabrication of phase-shifted Bragg grating waveguides in fused silica," Optics Letters, The Optical Society, vol. 37, No. 12, Jun. 15, 2012.

Lai, Y. et al., "Distributed Bragg reflector fiber laser fabricated by femtosecond laser inscription," Optics Letters, The Optical Society, vol. 31, No. 11, Jun. 1, 2006.

Ferrer, Andres et al., "In situ assessment and minimization of nonlinear propagation effects for femtosecond-laser waveguide writing in dielectrics," J. Opt. Soc. Am. B/vol. 27, No. 8, Aug. 2010.

Hill, Kenneth O. et al., "Fiber Bragg Grating Technology Fundamentals and Overview," J. Lightwave Tech., vol. 15, No. 8, Aug. 1997.

Marshall, Graham D. et al., "Point by Point Femtosecond Laser Inscription of Fibre and Waveguide Bragg Gratings for Photonic Device Fabrication," Proceedings of the 2nd Pacific International Conference on Application of Lasers and Optics, 2006.

\* cited by examiner

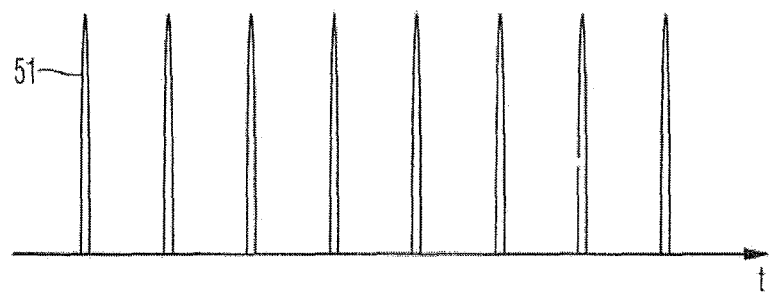
Fig. 4     (prior art)
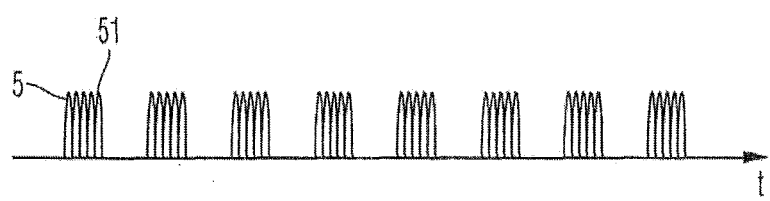
Fig. 5
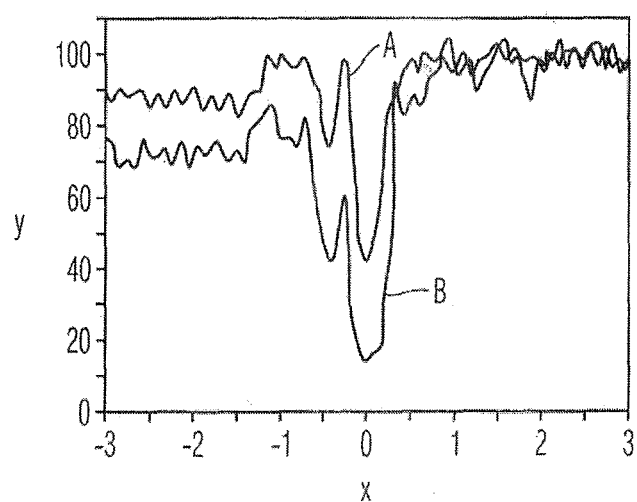
Fig. 6

METHOD AND DEVICE FOR PRODUCING AT LEAST ONE FIBER BRAGG GRATING

The invention relates to a method for producing at least one fiber Bragg grating in a waveguide, wherein the waveguide includes at least one core having a first refractive index and the fiber Bragg grating contains a plurality of spatial regions, each occupying a partial volume of the core and having a second refractive index, wherein the spatial regions are all produced by exposing laser radiation to a partial volume of the core. The invention also relates to a device for producing at least one fiber Bragg grating in a waveguide having at least one core by irradiating a plurality of spatial regions of the core using laser radiation. Fiber Bragg gratings of the above mentioned type can be used in optical communication networks for distributing and conditioning signals. Fiber Bragg gratings can also be used as a sensor element for temperature changes or mechanical tensions.

As is known from A. Martinez, M. Dubov, I. Khrushchev and I. Bennion: "Direct writing of fibre Bragg gratings by femtosecond laser", Electronics Letters, Vol. 40, No. 19 (2004) 1170, fiber Bragg gratings are produced in optical waveguides by point-to-point exposure using a femtosecond laser. The absorption of the laser radiation causes a change in the refractive index, and therefore part of the light guided in the waveguide is reflected and part of the light is transmitted at every boundary between irradiated and non-irradiated materials. If a plurality of irradiated regions is arranged at a defined distance in the spreading direction one behind the other in the waveguide, a grating structure is obtained where a settable wavelength or a settable wavelength region is reflected and light of different wavelength is transmitted.

However, the low contrast and/or the small change in the refractive index, which is induced by absorption of the femtosecond laser pulses, are disadvantageous in connection with this method. A fiber Bragg grating of higher optical quality can be produced by a higher energy of the individual pulses. However, this is heavy duty for regenerative amplifiers which increase the pulse energy of the femtosecond laser used for the production.

Proceeding from the prior art, the object of the invention is thus to provide a method and a device for producing fiber Bragg gratings, which require little instrument-based effort and can provide fiber Bragg gratings of high optical quality.

The object is achieved according to the invention by a method according to claim 1 and a device according to claim 8.

The invention proposes a method for producing at least one fiber Bragg grating in a waveguide. In some embodiments of the invention, the waveguide can be a ridge waveguide which is part of an integrated optical component. The integrated optical component can integrate a plurality of optical elements, e.g. couplers, interferometers or waveguides, on a substrate. In some embodiments, electrical components, e.g. photodiodes or signal amplifiers, can additionally be disposed on the substrate of the integrated optical component. In other embodiments of the invention, the waveguide can be or contain an optical fiber. The optical fiber can be made of glass or a polymer. The optical fiber contains at least one core. The core is usually surrounded by a casing. The core material has a greater refractive index than the material of the casing, and therefore light coupled into the core is totally reflected at the boundary between core and casing. In this way, the light can propagate with small losses along the longitudinal extension of the waveguide.

At least one fiber Bragg grating is arranged in the waveguide. The fiber Bragg grating contains a plurality of spatial regions each of which occupies a partial volume of the core and has a refractive index differing from the core material. The fiber Bragg grating is thus a periodic disturbance of the refractive index along the longitudinal extension of the waveguide. The entire longitudinal extension can be between about 5 mm and 40 mm. The number of irradiated spatial regions or partial volumes of the core in a fiber Bragg grating can vary between about 5000 and about 50000. In other embodiments of the invention, the number of irradiated spatial regions or partial volumes of the core in a fiber Bragg grating can vary between about 100 and about 50000. In other embodiments of the invention, the number of irradiated spatial regions or partial volumes of the core in a fiber Bragg grating can vary between about 1000 and about 10000.

In order to produce the individual spatial regions of the fiber Bragg grating, it is proposed according to the invention to use laser radiation. The laser radiation has a plurality of pulse trains, each of which contains a plurality of individual pulses. The pulse trains are characterized in that the time interval between successive individual pulses is shorter than the time interval between successive pulse trains. The use of pulse trains for producing an individual spatial region of a fiber Bragg grating has the advantage that the individual pulses are sequentially absorbed at the same location of the waveguide where they modify the material of the waveguide core in such a way that the refractive index is changed. The time interval of the pulse trains defines, together with the feed rate of the waveguide, the distance of the modified spatial regions and thus the grating constant.

In this case, the time interval of the individual pulses in a pulse train can be adjusted in such a way that, after the absorption of an individual pulse, the material of the core fully relaxes before the next individual pulse is received. In other embodiments of the invention, the time interval between individual pulses can be very short such that a subsequent individual pulse is received in the irradiated spatial region at a point in time at which phonons and/or electrons are still in an excited state on account of the preceding individual pulse. According to the invention, it has been found that when pulse trains are used instead of individual pulses to produce an individual spatial region having a modified refractive index, the total energy required in a pulse train for inducing the same change in the refractive index can be reduced. Alternatively, a greater change in the refractive index can be produced with the same or greater amount of energy of the pulse train compared to the individual pulses employed in the prior art so as to create a fiber Bragg grating having an improved contrast.

In some embodiments of the invention, the time interval between successive individual pulses can be between about 200 μs and about 50 ps. Correspondingly, the individual pulses impinge on a fully relaxed or an electronically and/or phononically excited material. The time interval between all individual pulses of a pulse train can be chosen to be identical. In other embodiments of the invention, the time interval between successive individual pulses of a pulse train can vary so as to provide an additional parameter for optimizing the optical properties of the resulting fiber Bragg grating.

In some embodiments of the invention, the time interval between successive individual pulses can be chosen to be between about 50 μs and about 1 μs. In this case, the individual pulses always impinge on a material fully relaxed to its basic state. However, in contrast to the irradiation of the waveguide by means of a plurality of individual pulses there is no positioning problem, i.e. the individual pulses of a pulse train always impinge on the same spatial region. This serves for avoiding the spatial region from being widened and thus the optical properties of the fiber Bragg grating from deteriorating.

In some embodiments of the invention, the time interval between successive individual pulses can be chosen to be between about 10 ns and about 100 ps. In this case, individual pulses can be absorbed in the material of the core of the waveguide if it is still in a phononically or electronically excited state due to the absorption of a preceding individual pulse. As a result, modifications of the material can be possible but cannot be produced by an individual pulse according to the prior art.

In some embodiments of the invention, the energy of a pulse train can be between about 100 nanojoule (nJ) and about 350 nJ. This energy can be supplied by a laser oscillator without a regenerative amplifier being necessary. Therefore, the method according to the invention can be carried out with reduced instrument-based effort to produce at least one fiber Bragg grating.

In some embodiments of the invention, every pulse train can contain between two and about 50 individual pulses. In other embodiments of the invention, every pulse train can contain between about 15 and about 30 individual pulses. It has been found that, on the one hand, said number of individual pulses is sufficient to provide fiber Bragg gratings having good optical properties, in particular high reflectivity and small band width. On the other hand, these individual pulses can be produced as a pulse train with little technical effort.

In some embodiments of the invention, it is possible to optimize the number of individual pulses in the pulse train and/or the time interval of the individual pulses and/or the amplitude of the individual pulses and/or the duration of the individual pulses depending on a measured variable. This enables the use of different laser radiation with different time structure for different waveguides which can be made from different materials. For example, the waveguide in an integrated optical component can contain a semiconductor material, e.g. silicon or a III-V compound semiconductor. If the waveguide contains or consists of an optical fiber, the latter can contain a polymer or glass. Said optimization method enables to always produce fiber Bragg gratings of good or the best possible quality in different materials.

In some embodiments of the invention, the measured variable can be selected from the reflectivity of the fiber Bragg grating and/or the band width of the fiber Bragg grating and/or the plasma intensity produced by the pulse train. The first two parameters directly detect the quality of the produced fiber Bragg grating. The plasma intensity produced by the pulse train determines the effect of the pulse train on the material of the waveguide.

In some embodiments of the invention, the optimization can be conducted by means of a control apparatus. The latter can be adapted to generate different pulse trains and assess the achieved result until a termination criterion is complied with. For example, the termination criterion can be chosen so as to obtain a fiber Bragg grating having desired target properties or the best possible fiber Bragg grating in a settable period. The quality of the fiber Bragg grating can be assessed by determining the reflectivity and/or the transmissivity, wherein an average wavelength and/or the width of a wavelength distribution can be used for the assessment.

In some embodiments of the invention, the optimization can be conducted with a genetic algorithm. With respect to the purposes of the present description, a genetic algorithm is understood to mean a class of stochastic metaheuristic optimization and/or search procedure, which follow the basic principles of biological evolution. At the beginning of such an algorithm, a randomly selected pulse train can be produced as a possible solution to the optimization problem. The thus produced fiber Bragg grating is assessed by means of a fitness function which describes the optimization problem to be solved. The solutions or pulse trains which have the best fitness values are randomly modified while the rest is discarded.

The newly obtained pulse trains are then assessed, wherein the iterations are continued until a termination criterion is achieved. The termination criterion can consist e.g. in producing a fiber Bragg grating having settable properties. Compared to other optimization methods, the proposed genetic algorithm has the advantage that only little knowledge of the problems is necessary, i.e. the interaction of the pulse train with the material of the waveguide does not have to be understood in detail.

In some embodiments of the invention, the pulse trains can be produced by turning on and off at least one laser light source. This method is in particular suitable for the pulse trains of prolonged duration, where the individual pulses have a greater time interval with respect to one another. In this case, the laser light source can be a semiconductor laser which can be modulated directly and which can be driven with short switching times by an electrical signal.

In some embodiments of this invention, the pulse trains can be produced by modulation of the amplitude and/or the phase of the laser light. This embodiment of the invention is particularly suitable to convert a spectrally wide-band laser pulse having a pulse duration from about 50 femtoseconds to about 10 picoseconds by modulating the amplitude and/or the phase in a pulse train including a plurality of individual pulses which have a short time interval with respect to one another.

In some embodiments of the invention, a device determined for carrying out the method has at least one support apparatus in which the waveguide can be attached and which is adapted to enable a relative movement between waveguide and laser light source. This enables a particular simple adaptation of the grating constant of the fiber Bragg grating to be produced since it follows from the feed rate of the relative movement and the repetition frequency with which the laser light source emits pulse trains.

In some embodiments of the invention, the laser radiation can be focused on the core of the waveguide by means of an optical system. As a result, a high optical performance can be concentrated in the selected spatial regions of the core and results in a significant change in the refractive index. Furthermore, the spatial regions which define the fiber Bragg grating can be designed to be spatially confined so as to produce a high quality grating.

The invention shall be explained in more detail below by means of drawings without limiting the general inventive concept.

FIG. 4 shows an example for modulated laser light according to the prior art.

FIG. 5 explains by way of diagram the modulation of laser light according to the invention.

FIG. 6 shows the transmission of two fiber Bragg gratings against the wavelength deviation for a fiber Bragg grating produced according to the invention and produced by means of known methods.

Figure 7:
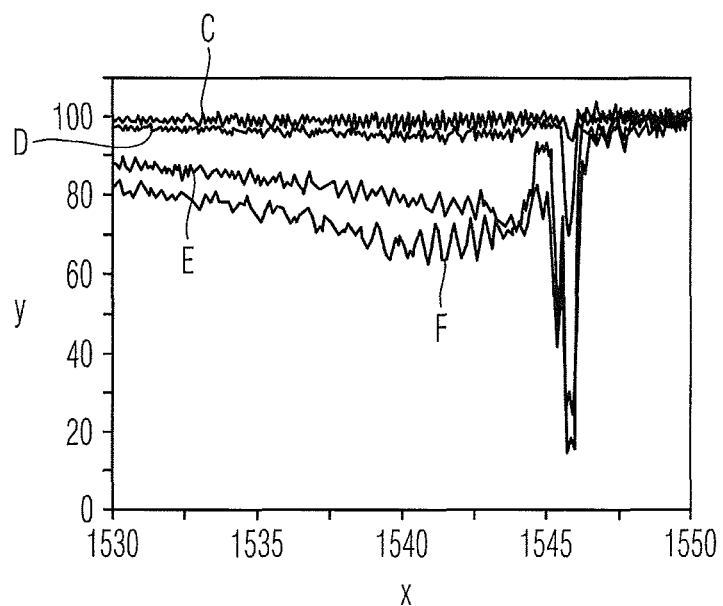

FIG. 7 shows transmission spectra of fiber Bragg gratings which were produced by means of different pulse trains.

Figure 8:
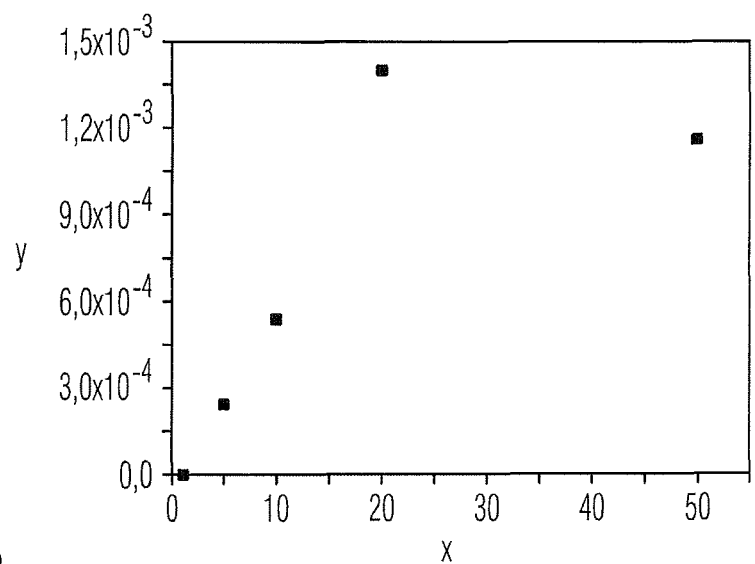

FIG. 8 shows the change in the refractive index depending on the number of individual pulses in the pulse train.

Figure 1:
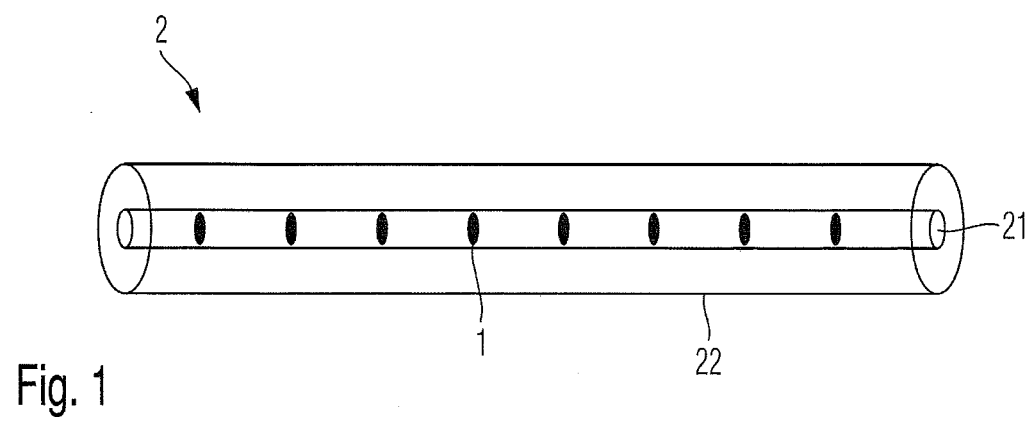
FIG. 1 shows the schematic diagram of a waveguide having fiber Bragg gratings.

FIG. 1 shows an exemplary embodiment of a waveguide 2 which contains a plurality of fiber Bragg gratings 1. The waveguide 2 contains at least one core 21 and a casing 22. Core and casing can be made from a polymer or glass. The casing has a smaller refractive index than the core, and therefore light in the core 21 is totally reflected at the boundary to the casing 22 and spreads along the longitudinal extension of the waveguide 2.

A plurality of fiber Bragg gratings 1 is arranged in the core. A fiber Bragg grating reflects a settable wavelength which depends on the grating constant of the fiber Bragg grating. However, other wavelengths are transmitted. When fiber Bragg gratings 1 of different grating constant are arranged at different locations, light propagating in the waveguide 2 and having different wavelength is reflected at different locations.

Figure 2:
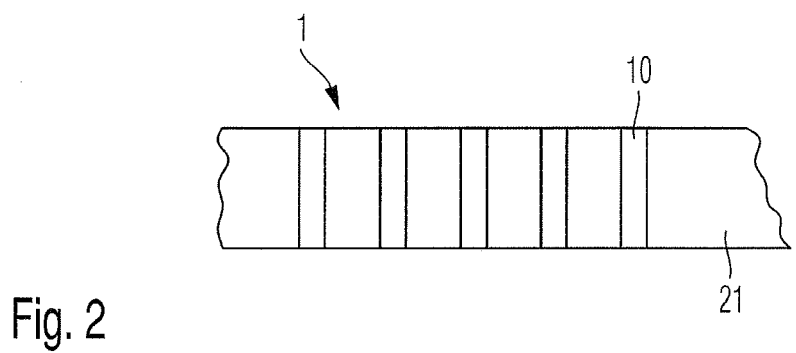
FIG. 2 shows a section from an individual fiber Bragg grating.

As is evident by means of FIG. 2, the fiber Bragg grating 1 substantially consists of a periodic disturbance of the refractive index, i.e. spatial regions 10 have a second refractive index $n_2$, which differs from the refractive index $n_1$ of the core 21. The distance of adjacent spatial regions 10 defines the grating constant of the fiber Bragg grating 1 and thus the reflected wavelength region.

The invention proposes to produce the spatial regions by laser radiation of the core 21, wherein at least one pulse train impinges on each spatial region 10, said pulse train containing a plurality of individual pulses. The individual pulses have a settable amplitude and a settable time interval with respect to one another.

Figure 3:
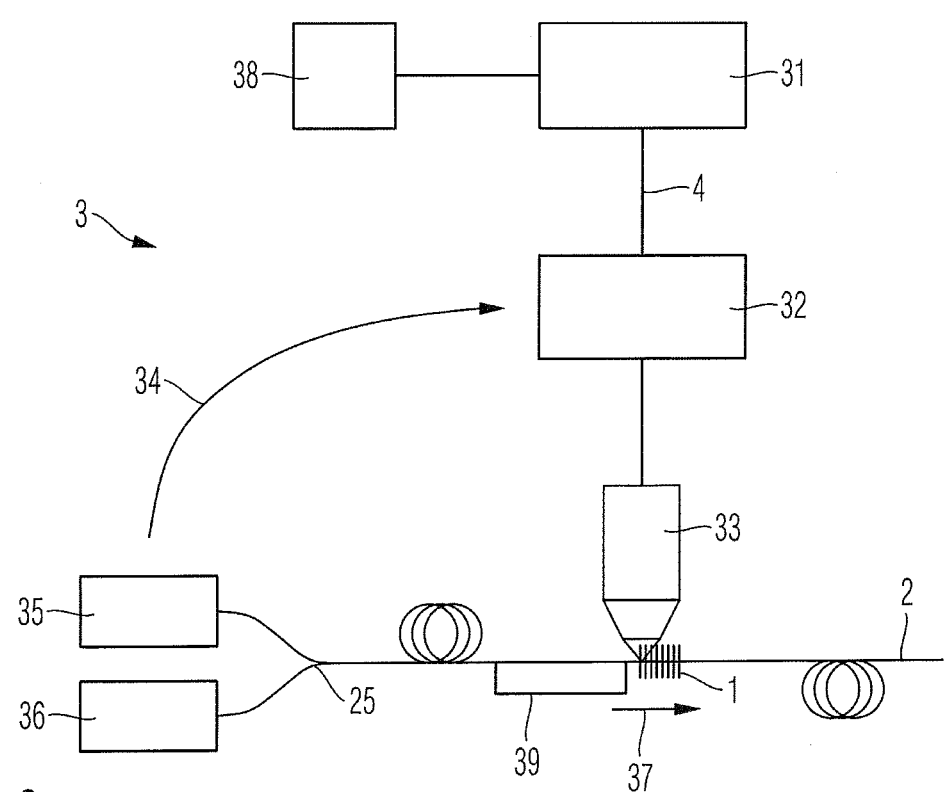
FIG. 3 shows a device usable for carrying out the method.

FIG. 3 explains a device for producing fiber Bragg gratings according to the present invention. In the exemplary embodiment as shown, an optical fiber is used as the waveguide 2. In some embodiments of the invention, this fiber can be a fiber usable for telecommunication purposes. In order to produce a fiber Bragg grating 1, at least one longitudinal section of the waveguide 2 is clamped in a support device 39. The support device 39 secures a settable position of at least one longitudinal section of the waveguide 2 and enables a relative movement between the laser light 4 and the waveguide 2 which is shown by the feed direction 37.

In order to produce a fiber Bragg grating 1, a plurality of spatial regions 10 has to be produced in the waveguide 2 as already explained by means of FIGS. 1 and 2. The grating constant here follows from the feed rate and the repetition rate by means of which pulse trains are emitted from the laser light source 31.

In some embodiments of the invention, the laser light source 31 can be a directly modulated semiconductor laser which enables short switching times. In other embodiments of the invention, the laser light source can be or contain a short pulse laser. The short pulse laser can produce laser pulses having a duration of about 50 fs to about 50 ps in a generally known way. The laser light 4 leaves the laser light source 31 in the direction of the waveguide 2.

An apparatus 32 for influencing the amplitude and/or the phase of the laser radiation produced by the laser light source is available to produce pulse trains. In other embodiments of the invention, pulse trains can be produced by means of an apparatus 38 for switching the laser light source 31. In other embodiments of the invention, both the apparatus 38 for switching the laser light source 31 and the apparatus 32 for modulating the amplitude and/or the phase of the laser light 4 can be provided in the device 3. In each case, the laser light 4 is modulated in such a way that it has a plurality of individual pulse trains prior to its impingement on the waveguide 2, wherein each pulse train contains a plurality of individual pulses, wherein the time interval between successive individual pulses is shorter than the time interval of successive pulse trains.

The laser light 4 can be focused by means of an optional optical apparatus 33, and therefore the spatial regions 10 are reduced with respect to the radiation cross-section of the laser light 4 and/or the intensity of the laser light in the core 21 is increased. It is thus possible to achieve that the interaction of the laser light takes predominantly place in the core 21 and the laser light passes through the casing 22 of the waveguide 2 with little intensity and, as a result of this, reduced absorption.

The optical apparatus 33 can contain at least one converging lens and/or a plurality of converging and/or diverging lenses and/or one or more mirrors to focus the laser light 4 as desired.

In order to monitor the manufacturing method of the fiber Bragg grating 1, some embodiments of the invention can provide a connection between the waveguide 2 and an optical spectrum analyzer 35. The optical spectrum analyzer 35 can detect the plasma emission in the core 21, which is triggered by the incident pulse train. If the detected spectrum differs from a settable target spectrum or a target intensity, which was determined in advance, the pulse train can be modified to such an extent that the modification of the material of the core 21 can be carried out as desired.

In some embodiments of the invention, the waveguide 2 can additionally be connected to a light source 36 via a coupler 25. The light source 36 can contain e.g. a tunable semiconductor laser and/or a superluminescence diode or another wide-band light source. The light of the light source 36 can then be coupled into the waveguide 2 via the coupler 25 and leave it at the opposite end. During the generation of the fiber Bragg grating 1, a wavelength range produced by the quality and the grating constant of the fiber Bragg grating 1 is reflected and can be identified in the optical spectrum analyzer. A reflection signal can already be observed after writing in about 100 grating points. Therefore, it is possible to monitor in a simple way whether a fiber Bragg grating having the desired properties is produced. If this is not the case, a control device 34 which influences either apparatus 32 or apparatus 38, can change the pulse train, and therefore another fiber Bragg grating having different parameters can be produced. It has been shown that a pulse train which is optimal for the respective material of the waveguide 2 can already be found after 50 to 100 iteration cycles, i.e. about 5000 to 10000 written grating points. All subsequent fiber Bragg gratings can then be produced with these settings without any further optimization of the pulse train, and therefore a simple mass production of waveguides 2 having fiber Bragg gratings 1 is enabled and only short set-up times are required for the machine setting when the material is changed.

FIG. 4 explains once again the time structure of the laser light 4, which is used according to the prior art for the production of fiber Bragg gratings. In this case, the laser light 4 contains a plurality of individual pulses 51 each of which has a pulse duration of about 100 femtoseconds and is emitted with a repetition rate of about 100 Hz from the laser light source. Each individual pulse 51 produces a spatial region 10 as part of a fiber Bragg grating 1, and therefore the grating constant is only determined by the feed rate of the relative movement 37 when the repetition rate is constant. A fiber Bragg grating having e.g. 10000 spatial regions 10 can then be produced in 100 seconds.

Compared thereto, it is proposed according to the invention to use, instead of individual pulses 51, pulse trains 5 each of which contains a plurality of individual pulses 51. The pulse trains 5 can also be produced with a repetition rate of 50 Hz to about 1000 Hz or with a repetition rate of about 50 Hz to about 200 Hz by the laser light source 31. Compared thereto, the time interval of adjacent individual pulses 51 is shorter. In some embodiments, it can be at least 50 picoseconds to about 200 µs. The number of the individual pulses 51 in a pulse train 5 can be at least 2 and at most about 50. In some embodiments of the invention, about 15 to about 30 individual pulses 51 can be contained in a pulse train 5. The amplitude of the individual pulses 51 can be constant, as illustrated in FIG. 5, or the individual pulses 51 can have different amplitudes and/or pulse widths. If each individual spatial region 10 of a fiber Bragg grating 1 is produced by a pulse train 5, the grating constant of the produced fiber Bragg grating also depends in this case exclusively on the feed rate when the repetition rate is constant. However, each spatial region 10 is produced by a plurality of individual pulses 51. As a result, a major change in the refractive index is possible and/or, when the change in the refractive index is identical, the energy of a pulse train can be smaller than the energy of an individual pulse 51 according to FIG. 4.

The ordinate in FIG. 6 shows the transmission losses of a fiber Bragg grating and the abscissa shows the wavelength deviation in nanometers. Curve A shows a fiber Bragg grating which was produced with individual pulses having a pulse energy of 470 nJ as shown by means of FIG. 4. Compared thereto, curve B of FIG. 6 shows measured values for a fiber Bragg grating where each spatial region 10 was produced with a pulse train which contains 20 individual pulses 51, each of which has a total energy of 280 nJ. Each fiber Bragg grating contains 1400 spatial regions 10.

FIG. 6 clearly shows the smaller transmission of the fiber Bragg grating produced according to the invention at the desired reflection wavelength of the fiber Bragg grating, i.e. with a wavelength deviation of 0 nanometers. This means that the reflection of the fiber Bragg grating which was produced according to the method of the invention is enlarged. These improved properties of the fiber Bragg grating can be produced by the method according to the invention although the energy of the individual pulses according to the invention is lower than the energy of the individual pulses used in the known method, and therefore a regenerative amplifier can be omitted in the manufacturing method according to the invention.

FIG. 7 shows the transmission spectrum of fiber Bragg gratings on the ordinate and the wavelength in nanometers on the abscissa for fiber Bragg gratings which were produced with different pulse trains. The pulse trains here differ by the number of individual pulses contained in the pulse train. Curve C shows the transmission against the wavelength for a fiber Bragg grating, for the production of which pulse trains were used which contain 5 individual pulses. Curve D shows the transmission of a fiber Bragg grating where the spatial regions 10 were produced by pulse trains each having 10 individual pulses. Curve E shows the transmission of a fiber Bragg grating for the production of which pulse trains each having 20 individual trains were used, and curve F shows the transmission of a fiber Bragg grating for the production of which pulse trains each having 50 individual pulses were used. FIG. 7 shows that no fiber Bragg grating could be produced with five individual pulses per pulse train. When the number of the individual pulses is higher, the transmission decreases at a wavelength of 1546 nanometers. This can be ascribed to the production of a fiber Bragg grating in the waveguide. The transmission or reflection of the fiber Bragg grating at 1546 nanometers quickly increases with increasing pulse number. Only one small improvement can be achieved above 20 pulses per pulse train.

FIG. 8 shows the change in the refractive index between the first refractive index $n_1$ of the core of the waveguide 2 and the second refractive index $n_2$ of the spatial regions 10 depending on the number of individual pulses in a pulse train on the abscissa. It is evident from FIG. 8 that the change in the refractive index rapidly increases with increasing number of individual pulses and reaches a maximum of about $1.3 \times 10^{-3}$ with 20 individual pulses per pulse train. Therefore, a high quality fiber Bragg grating can be produced in the investigated material system with these pulse trains.

Of course, the invention is not limited to the embodiments shown in the drawings. Therefore, the above description should not be considered to be limiting but explanatory. The following claims are to be comprehended in such a way that a feature mentioned is present in at least one embodiment of the invention. This does not rule out the presence of further features. If the claims and the above description define "first" and "second" features, this designation serves for distinguishing two similar features without determining an order of priority.

The invention claimed is:

1. Method for producing at least one fiber Bragg grating in a waveguide, wherein the waveguide has at least one core having a first refractive index (n1) and the fiber Bragg grating contains a plurality of spatial regions, each of the spatial regions occupies a partial volume of the core and has a second refractive index (n2), wherein each of the spatial regions is produced by the exposure of a partial volume of the core to laser radiation, wherein the laser radiation comprises a plurality of pulse trains, each of the pulse trains comprises a plurality of individual pulses, wherein the time interval between successive individual pulses is shorter than the time interval between successive pulse trains and the time interval between successive individual pulses is chosen to be between 10 ns and 100 ps or the pulse train has a duration of 50 fs to 50 ps, wherein at least one of a number of individual pulses in the pulse train, a time interval of the individual pulses, an amplitude of the individual pulses, or a duration of the individual pulses is optimized depending on a measured variable selected from a reflectivity of the fiber Bragg grating, a band width of the fiber Bragg grating, and a plasma intensity produced by the pulse train.

2. Method according to claim 1, wherein the time interval between successive individual pulses is chosen in such a way that individual pulses are absorbed in the material when the latter is still in a phononically or electronically excited state on account of the absorption of a preceding individual pulse.

3. Method according to claim 1, wherein the energy of a pulse train is selected to be between 350 nJ and 100 nJ.

4. Method according to claim 1, wherein each pulse train contains between 2 and 50 individual pulses or wherein each pulse train contains between 15 and 30 individual pulses.

5. Method according to claim 1, wherein the optimization is conducted by means of a control apparatus.

6. Method according to claim 1, wherein the optimization is conducted by means of a genetic algorithm.

7. Method according to claim 1, wherein the pulse trains are produced by any of switching a laser light source and/or modulation of the amplitude of the laser light and/or modulation of the phase of the laser light.

8. Method for producing at least one fiber Bragg grating in a waveguide, wherein the waveguide has at least one core having a first refractive index ($n1$) and the fiber Bragg grating contains a plurality of spatial regions, each of the spatial regions occupies a partial volume of the core and has a second refractive index ($n2$), wherein each of the spatial regions is produced by the exposure of a partial volume of the core to laser radiation, wherein the laser radiation comprises a plurality of pulse trains, each of the pulse trains comprises a plurality of individual pulses, wherein the time interval between successive individual pulses is shorter than the time interval between successive pulse trains and the time interval between successive individual pulses is chosen to be between 10 ns and 100 ps or the pulse train has a duration of 50 fs to 50 ps, wherein the time interval between successive individual pulses is chosen in such a way that individual pulses are absorbed in the material when the latter is still in a phononically or electronically excited state on account of the absorption of a preceding individual pulse, wherein at least one of a number of individual pulses in the pulse train, a time interval of the individual pulses, an amplitude of the individual pulses, or a duration of the individual pulses is optimized depending on a measured variable selected from a reflectivity of the fiber Bragg grating, a band width of the fiber Bragg grating, and a plasma intensity produced by the pulse train.

9. Method according to claim 8, wherein the energy of a pulse train is selected to be between 350 nJ and 100 nJ.

10. Method according to claim 8, wherein each pulse train contains between 2 and 50 individual pulses or wherein each pulse train contains between 15 and 30 individual pulses.

11. Method according to claim 8, wherein the pulse trains are produced by any of switching a laser light source and/or modulation of the amplitude of the laser light and/or modulation of the phase of the laser light.

12. Device for producing at least one fiber Bragg grating in a waveguide having at least one core by irradiating a plurality of spatial regions of the core using laser radiation, containing
    at least one laser light source which is adapted to produce laser radiation which comprises a plurality of pulse trains, each of which comprises a plurality of individual pulses, wherein the time interval between successive individual pulses is shorter than the time interval between successive pulse trains and the time interval between successive individual pulses is chosen to be between 10 ns and 100 ps or the pulse train has a duration of 50 fs to 50 ps,
    at least one support apparatus in which the waveguide can be attached and which is adapted to enable a relative movement between waveguide and laser light source,
    an apparatus for detecting at least one of a reflectivity of the fiber Bragg grating, a band width of the fiber Bragg grating, or a plasma intensity produced by the pulse train.

13. Device according to claim 12, further containing an optical system by means of which the laser radiation can be focused on the core of the waveguide.

14. Device according to claim 12, wherein the laser light source is adapted to produce laser radiation where the energy of an individual pulse train is selectable between 350 nJ and 100 nJ.

15. Device according to claim 12, further comprising a control apparatus being adapted to influence the number of the individual pulses in a pulse train and/or the time interval of the individual pulses and/or the amplitude of the individual pulses and/or the duration of the individual pulses and/or the time interval of the pulse trains.

16. Device according to claim 12, further comprising an apparatus being adapted to switch the laser light source and/or to influence the amplitude of the laser radiation produced by the laser light source and/or to influence the phase of the laser radiation produced by the laser light source.

* * * * *